United States Patent [19]

Smith

[11] Patent Number: 4,644,832
[45] Date of Patent: Feb. 24, 1987

[54] METHOD FOR MONITORING SAW BLADE STABILITY AND CONTROLLING WORK FEED RATE ON CIRCULAR SAW AND BANDSAW MACHINES

[76] Inventor: H. Reid Smith, P.O. Box 2200, Poulsbo, Wash. 98370

[21] Appl. No.: 714,466

[22] Filed: Mar. 21, 1985

[51] Int. Cl.$^4$ .............................................. B26D 5/00
[52] U.S. Cl. ..................................... 83/72; 83/403.1; 364/475
[58] Field of Search ..................... 83/72, 62, 74, 62.1, 83/75, 76, 522, 365, 403.1; 364/475; 318/39; 73/658, 660, DIG. 1

[56] References Cited

U.S. PATENT DOCUMENTS 4,087,801  5/1978  Noh .................................. 73/658 X
4,358,974  11/1982  Sakurai .............................. 83/72 X Primary Examiner—James M. Meister
Assistant Examiner—John L. Knoble

[57] ABSTRACT

A position sensing transducer senses the lateral movement of the saw blade resulting from variable operating conditions. These sensed values are displayed on instrumentation for use by the saw machine operator, and are also used to automatically control work feed rates and/or rim speed of the saw blade. These automatica corrections and/or compensations maintain lateral movement of the saw blade within established limits. Optimized work feed rates and superior cutting accuracy result from this precise automatic control.

4 Claims, 1 Drawing Figure

METHOD FOR MONITORING SAW BLADE STABILITY AND CONTROLLING WORK FEED RATE ON CIRCULAR SAW AND BANDSAW MACHINES

BACKGROUND OF INVENTION

1. Field of the Invention

This invention relates to circular saw and bandsaw machines, and incorporates a method of controlling the rate at which the work is presented to the saw blade, plus a method for monitoring, displaying, and controlling the performance of the saw blade within predetermined levels of stability by altering the feed rate.

2. Description of the Prior Art

Circular saw and bandsaw machines have long been used as economical means for cutting wood, metal, and other materials. In recognition of the high costs for raw material and labor, automatic/computer control of work feed rates and sawing accuracy becomes of paramount importance. Optimized automatic control of work feed rates and saw blade stability keeps material and production costs down. The use of thinner saw blades and smaller rough sawn dimension sizes can conserve natural resources in the wood products industry, and reduce material waste in all industries which use circular saw and bandsaw machines in the manufacturing process. In the lumber industry, current production methods result in a larger than necessary amount of waste in order to manufacture finished dimension lumber. Reduction of this waste requires the solution of several technical problems.

The first problem is the rate at which the work is fed into the saw blade. The work is either manually or automatically fed into these sawing machines. In manually fed machines, the operator listens to the sound of the saw blade and varies the feed rate by judgement, frequently not realizing that the saw blade is being overfed. Sawing machines having automatic feed systems, use predetermined feed rates as a function of thickness of work (depth of cut). These predetermined feed rates do not consider any variable except depth of cut. This automatic feed system permits overfeeding and in some cases underfeeding of the saw machine, resulting in erratic lateral movement of the saw blade and loss of control of the saw line. Slower than optimum feed rates are required to compensate for the variable densities of wood encountered from summer to winter, density changes within the same log, partially frozen logs, and the sharpness of the saw blade cutting teeth. These variables all require on-line adjustments to work feed rates.

The second problem is the target size of the rough sawn work, which must be maintained large enough so that finished lumber is not undersized. This excess material, which is later removed to produce finish dimension lumber, represents waste. Uncontrolled lateral deviations in the saw lines during the cutting operation require larger rough sawn target sizes. These saw blade movements have several causes: mis-alignment of saw blade guides, normal saw blade tooth wear, bending or uneven dulling of saw teeth, and knots in the saw log. These typical conditions can cause lateral instability of the saw blade, with resultant deviations of the saw line.

The third problem is offsetting of the saw blade from the desired saw line. If the saw teeth are dulled by sand, gravel or other foreign objects embedded within the work, the saw blade can be thrust to one side for the entire length of the cut, offsetting the saw line from a minor deviation of 0.005 to a major of 0.080 of an inch. When a saw blade runs in an offset condition and encounters a knot, or is substantially over-fed, it is possible for the saw blade to run completely out of the work. This ruins the saw blade tension, requiring hours of bench work to bring the saw back into proper tension so that it will again cut straight and accurately. The saw blade could also disintegrate, destroying itself and surrounding equipment, thus requiring down time to repair the damage. The safety of personnel is also placed in jeopardy if the saw blade disintegrates.

The fourth problem is the width of the saw cut, or kerf. Reduction of the saw blade gauge/thickness, and of side clearance, (the distance the tooth extends beyond the side of the saw blade body), decreases the width of the kerf. Heavier gauges and larger side clearance are currently used to protect the saw from the instability effects of excessive feed rates.

The fifth problem encompasses other considerations that directly affect optimized cutting efficiency, such as saw blade design, saw blade strain, and guide pressure.

At the present time, these considerations are being addressed by using larger rough sawn lumber target sizes, thicker saw blades, and larger kerf dimensions. Numerous attempts through the years have been made to solve these problems, with varied success.

1. Saw blade strain devices such as weight and lever or high strain pneumatic systems have improved saw blade performance. Some improvement in saw blade stability has been obtained, and higher feed rates achieved.

2. The use of pressure guides provides an additional increment of saw blade stability. These devices are commonly used in the wood products industry.

3. A control system utilizing the saw blade sagging angle in the direction of the work feed was the basis for U.S. Pat. No. 4,437,367 which was issued to Karl Hauser. This system works well in small bandsaw machines, but will not function adequately with the larger bandmill machines which have wider saw blades. This patent applies to bandsaw machines that hinge and move to the work in lieu of the work feed system common in larger sawing machines in which the work is fed into the machine.

4. Utilizing the pressure imposed by the work on the back of the saw blade to control work feed rates, as in U.S. Pat. No. 3,680,417 issued to John R. Wells, has merit when using small bandmill machines which use throw-away saw blades. Large bandsaw machines have blade widths exceeding two inchs, and the same problems exist with this patent as with the saw blade sagging angle control system.

SUMMARY OF THE INVENTION

The first objective of this invention is to increase production by maximizing work feed rates through the sawing machine, and automatically control work feed rates in direct proportion to the saw blade's ability to maintain a straight and accurate saw line in the work. The work being sawn may have continuously varying density, moisture content, and temperature. Saw blade variables, such as individual tooth sharpness or saw blade tension, also contribute to saw blade stability. Foreign material, such as embedded gravel or metal objects, induce instability when encountered by the saw blade. Saw blade instability resulting from any of these conditions is detected by the new invention, displayed, and used to automatically correct feed rates. This new invention will automatically maximize work feed rates under all sawing conditions.

It is a further objective of the invention to increase the amount of finished product which can be manufactured from raw material by reducing waste in the cutting process. Sawing variations are maintained within established limits by automatic control. Kerf reduction can be accomplished, because saws are protected against over feeding.

It is a further objective to provide added safety for operating personnel by reducing the probability of saw blade disintegration while in operation. Damage to surrounding equipment, and replacement of destroyed saw blades, is also prevented.

It is a further objective of this invention to protect the saw blade, and prevent it from operating in a unstable condition. This unstable condition produces saw blade damage which results in extra hours of bench work for leveling, tensioning, and straightening so that the saw blade will again cut a straight and accurate saw line at an optimum feed rate.

It is a further objective of this invention to detect misalignment of saw guides, and other mechanical alignment problems.

It is a further objective of this invention to quantify saw blade performance, and display this numerical information on control panel instruments. Saw blade operating status is also visually displayed on an oscilloscope. Results of sawing machinery adjustments, and saw blade design changes are indicated numerically on instrumentation, in appropriate engineering units.

It is a further objective of this invention to detect and avoid critical operating feed rates/rim speeds, in combination with specific work thickness designations, which result in excessive resonant vibration.

Further objectives, such as decreased maintenance, efficiency of operation, extended saw blade life, and extended intervals between saw blade sharpening, are met by the invention.

This new invention provides other benefits, obvious to one skilled in the art. Improved efficiency and productivity are inherent in the ability to sense saw blade stability conditions, display this information for use by saw machine operators, and utilize stability data to control feed rate at its optimum value.

DETAILED DESCRIPTION OF THE INVENTION

Figure 1:
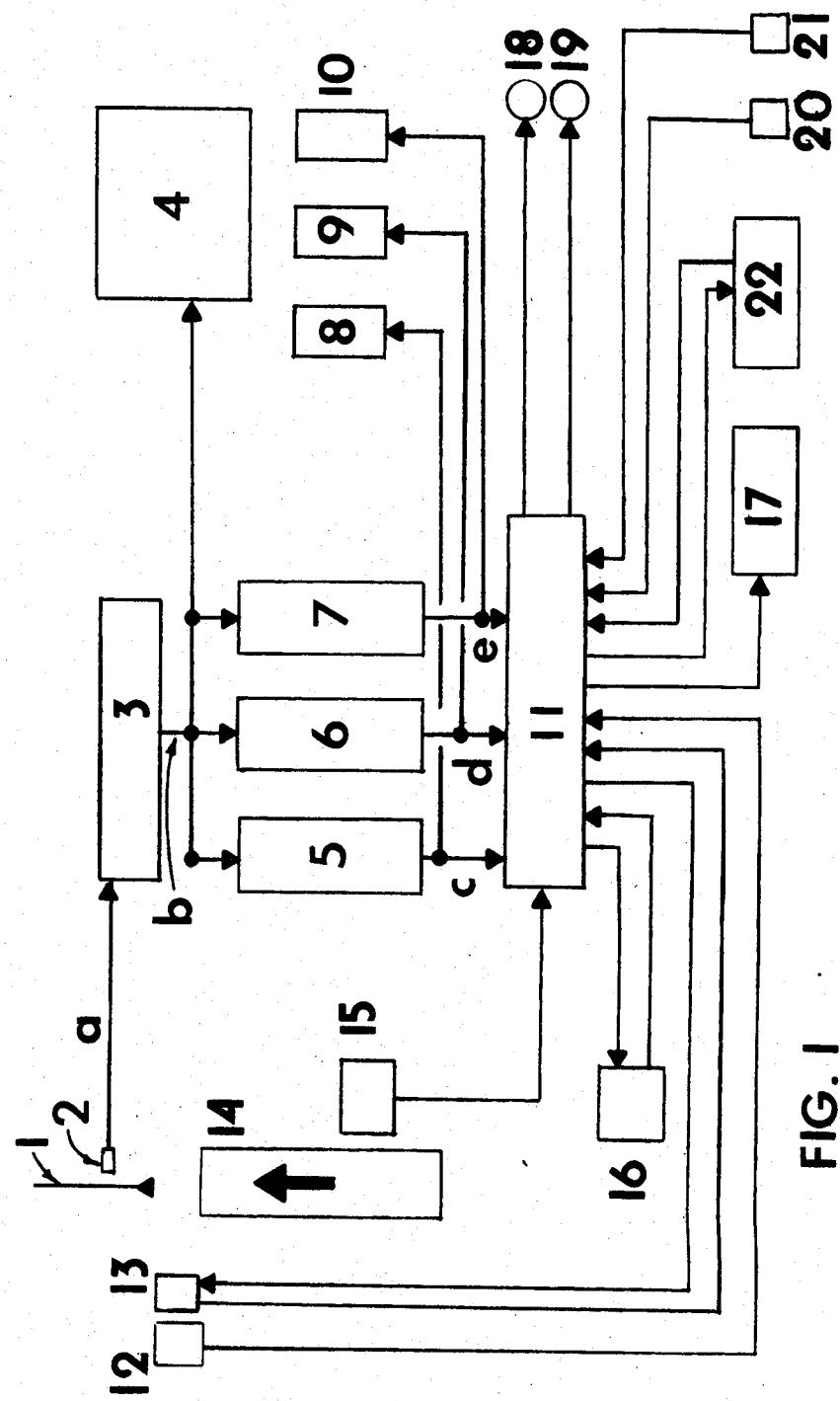
FIG. 1 is a schematic diagram of the saw control system, incorporating all significant components, and illustrating their inter-relationships.

For details of the invention refer to FIG. 1. The saw blade (1) of either a circular or a band type has a plurality of teeth and is secured in a circular or bandsaw machine for the purpose of cutting the work material. A sensing means (2), which may be an inductive coil, detects the lateral movement of the saw blade (1). This sensing means (2), being referenced from the saw machine framework, is responsive to the lateral movement of the saw blade (1) and outputs an electrical signal (a). The sensing means (2) is physically attached to the top saw blade guide, which is attached to the saw machine frame. In some cases, the sensing device can be affixed directly to the saw machine framework. The sensing means (2) is mounted between the work being sawn and the top saw guide. This requires the top saw guide to be positioned far enough above the work, so the sensing means (2) obtains superior representation of true saw blade lateral movement within the work.

The electronic signal conditioning means (3) (5) (6) (7) and control functions means (11), along with the display means (4) (8) (9) (10), can be separate devices which are interconnected with cabling, or can be one electronic device that performs all logical functions. The configuration may be changed to accomodate advances in technology without changing the function or logic of the invention. The primary signal conditioner (3), conditions the signal (a) from the detection means (2) into a proportional electrical signal (b), representing the exact referenced lateral movement of the saw blade (1). An oscilloscope (4) allows the exact lateral movement signal (b) of the saw blade (1), to be displayed for visual diagnostic interpretation. This is especially useful when comparing the performance of two saw blades simultaneously if design or other operating changes have been made.

The secondary signal conditioner means (5) converts the amplitude of the primary conditioned signal (b) into a linear signal (c), thus representing the peak-to-peak value so that corresponding engineering units of measurement (millimeters or thousands of an inch) can be assigned. This conditioned signal (c), having assigned value, can now be used for visual display (8) and control functions.

The secondary signal conditioner means (6) takes the average of the primary conditioned signal (b) and outputs an electrical signal proportional to the lateral mean position of the saw blade (1) in reference to the sensing means (2). This measurement value represents zero deflection when the electrical output signal (d) is at 50% of the total signal output. This permits positive and negative saw blade displacements from a referenced neutral position to be indicated for visual display (9) and control functions.

The secondary signal conditioner means (7) extracts the displacement RMS (root mean square) value of the primary conditioned signal (b), and outputs this conditioned signal (e) for visual display (10) and control functions.

The central processing unit (CPU) (11) can incorporate means such as a computer, microprocessor, or programmable logic controller. The normal continuous sequence of events for the CPU (11) with the sawing (1) and work moving machinery (16) in a running and operational condition, are as follows:

1. The work (14) passes by the thickness measurement (depth-of-cut) means (15) and an indicating signal is sent to the CPU (11). The thickness detection means (15), can be a group of photo cells which are progressively blocked as the thickness of the work increases. In systems that are optically scanned, the work thickness measuring means can be a signal from another computer providing the thickness (depth-of-cut) information.

2. The CPU (11) matches the thickness measurement designation with a predetermined optimum feed rate speed, and outputs this value to the variable speed work feed means (16), which responds with the requested feed rate. Since most saw blade drive motors (13) are single speed, the rim speed of the saw is constant. With variable speed drive motor applications, the thickness measurement designation would also be matched with a predetermined output signal to the drive motor (13) for optimum rim speed. These two functions, that of saw blade rim speed and work feed rate, determine the bite depth of the saw tooth and the ultimate work feed rate. It is noted, that it would be logical to always run the saw at top rim speed, however, in consideration of mechanical wear, work handling means, saw blade stability, saw blade longevity, and maximum/minimum tooth bite requirements, the higher rim speed for some work thicknesses would not produce optimum work cutting.

3. The CPU (11) examines the saw blade motor load indicating means (12) for greater than predetermined levels of cutting load for the thickness designation of the work being sawn. If the first predetermined level of motor load has been reached, the alarm indicating means (18) will be on. If the second (greater) predetermined level of load is reached the alarm indicating means (19) will be on.

4. The CPU (11) examines the input signal (c) for peak-to-peak saw blade movement to see if it is greater than the predetermined first and second levels of alarm. If the signal is greater, the output alarm means (18) (19) are indicating respectively.

5. The CPU (11) examines the input signal (d) for average displacement of the saw blade with four predetermined levels of alarm. The levels are for first and second alarm in the positive direction (away from the sensing means), and for first and second alarms in the negative direction (toward the sensing means), with respective alarms (18) (19) indicating if a violation exists.

6. The CPU (11) examines the input signal (e) of the displacement RMS value to determine if the first and second predetermined alarm levels are violated. The respective alarm means (18) (19), will indicate if alarms exist.

7. The first alarm (18) is less critical than the second alarm. The second alarm (19) represents a real danger to the saw blade (1) and indicates large variations in the saw line. As indicated, the first alarms from all of the discrete input signals (c) (d) (e) (12) are combined into one alarm (18). The second alarms from all of the discrete input signals (c) (d) (e) (12) are combined into one alarm (19).

8. When the first alarm indicator (18) is in alarm condition, the output signal to the feed rate means (16) is changed one predetermined increment, and if the drive motor (13) is variable speed, the saw drive motor is changed one predetermined speed increment. The data recorder means (17) records the time, thickness designation of the work, and which discrete input alarm was in violation. If the first alarm remains in alarm condition for more than a predetermined amount of time, the CPU (11) changes the feed rate means (16)/drive motor (13), again and this loop continues until the alarm is cleared or the second alarm (19) is reached. The work feed rate for this work thickness designation remains at the lower setting for the next several (predetermined) pieces of work having the same thickness designation. If a predetermined number of work pieces with the same thickness designation cycle through the sawing machine without further alarms, the speed rate signal is increased one increment. This sequence continues until the normal preset feed rate corresponding to this thickness designation is attained. If this work thickness designation results in an alarm as the feed rate is increased, the feed rate will remain at the lower speed setting until the saw is changed, or the operator pushes the reset/saw change button (20). This returns all feed speed rates to their highest predetermined speed setting. The data recorder means (17) records the date and time, and notes that the reset/saw change button was pushed. The sawing operation should continue until several speed increments below optimum feed rate have occured, at which time the saw blade (1) should be changed and the reset/saw change button (20) pushed.

9. When the second level alarm (19) is in alarm condition, the first alarm control functions have already occurred. The feed system (16) is automatically stopped. To continue, the operator must determine the problem and push the override button (21). The saw drive motor (13) is left running so the operator can clear the work material (14) by slowly feeding it through the sawing machine, or he can shut off the drive motor (13) and change the saw blade (1). Some saw machine installations may require the drive motor (13) to be shut off automatically, but this operation is not the preferred embodiment.

10. Each individual saw blade, and saw machine, has different feed rates, rim speeds, and work thickness combinations which excite inherent resonance at some vibration frequencies. If the operating feed rate for one of the thickness designations is below the maximum preset feed rate, the CPU (11) examines for critical saw blade (1) vibration, as identified by previous peak-to-peak (c) and the RMS (e) alarm signals retained in the CPU (11) memory. The alarm data is examined for a predetermined number of alarms which have caused the feed rate to be slowed. If these peak-to-peak and RMS alarms are identified in a particular feed rate/rim speed and thickness designation, this combination will be by-passed automatically as the control system increments the feed rate. Information concerning the by-passed combination will be displayed at the data recorder (17). The CPU (11) adjusts the feed rate to a value above the critical speed, but not higher than the maximum allowable. This permits the system to by-pass critical speeds and use higher feed rate/rim speed combinations to maintain saw blade stability. Only a predetermined number of feed rate increases will be allowed. Pressing the reset/saw change button removes all temporary by-passes. Permanent by-passes may be provided, at the operator's option, by utilizing the operator terminal means (22).

The CPU (11) continuously monitors the program, input signals operating parameters and outputs corrected signal to the work feed rate means. The operator terminal means (22) permits changes to the program and operating parameters.

There are many sawing control program variations which are obvious to one skilled in the art. However, monitoring saw blade lateral movements, analysis of those movements, and the utilization of this information to optimize saw machine performance is the embodiment of this invention.

I claim:

1. A method of controlling vibration in saw blades comprising:
    detecting lateral movement of saw blade;
    using signal conditioning means to provide an electrical signal proportional to said saw blade movement;
    calculating referenced mean displacement, peak to peak, and displacement RMS signals;
    comparing the conditioned signals to assigned levels; and controlling the speed of the saw blade responsive to said comparison by predetermined program logic.

2. A method according to claim 1 whereby critical saw blade vibrations are by-passed.

3. A method of controlling vibration is saw blades comprising:

detecting lateral movement of saw blade;

using signal conditioning means to provide an electrical signal proportional to said saw blade movement;

calculating referenced mean displacement, peak to peak, and displacement RMS signals;

comparing the conditioned signals to assigned levels; and controlling the work feed rate responsive to said comparison by predetermined program logic.

4. A method according to claim 3 whereby critical saw blade vibrations are by-passed.

* * * * *